United States Patent [19]
Bole et al.

[11] 3,765,861
[45] Oct. 16, 1973

[54] APPARATUS FOR HEAT TREATING LENSES

[75] Inventors: Hamilton B. Bole, Sturbridge; Howard E. Chace, Southbridge, both of Mass.

[73] Assignee: American Optical Corporation, Southbridge, Mass.

[22] Filed: Apr. 21, 1972

[21] Appl. No.: 246,205

[52] U.S. Cl. ................................. 65/162, 65/114
[51] Int. Cl. ............................................ C03b 27/00
[58] Field of Search ..................... 65/161, 162, 160, 65/114, 269, 348

[56] References Cited
UNITED STATES PATENTS
2,695,475   11/1954   Ellis .................................. 65/160 X Primary Examiner—Arthur D. Kellogg
Attorney—William C. Nealon et al.

[57] ABSTRACT

A lens heat treating machine having a furnace and lens elevating means for receiving and moving lenses into and out of the furnace for exposure to heating and cooling environments respectively. The machine incorporates electromechanical lens gauging means arranged to automatically program heating and cooling cycles according to color and thickness characteristics of lenses placed therein. Manual programming and operation of the machine is also provided for.

4 Claims, 4 Drawing Figures

APPARATUS FOR HEAT TREATING LENSES

BACKGROUND OF THE INVENTION

1. Field of the Invention

Apparatus for tempering glass articles with particular reference to a machine for heat treating ophthalmic lenses for toughening same against damage resulting from impact or pressure applied to surfaces or edges thereof.

2. Description of the Prior Art

Lens heat treating apparatuses have, heretofore, been designed to operate with one oven temperature selected in each case to serve at least the largest part of all lens dioptric values, thicknesses and colors normally encountered in ophthalmic optics. Since thicker and heavier lenses require different periods of heating and cooling than do thinner and lighter lenses, a considerable span of heating and cooling time periods are required to be used in the course of tempering the usual variety of lenses encountered in routine lens shop activities. Accordingly, the scheduling of shop work has been rendered difficult. Time required for calculating proper heating and cooling cycles or searching charted information for each lens and implementing the different apparatus settings in each case have rendered such processing of ophthalmic lenses considerably less than optimum in efficiency, costliness and convenience.

Accordingly, the present invention has for an objective the accomplishment of substantial savings in operational time, easing of operator fatigue, lessening of the need for special skills and otherwise generally improving, facilitating and economically enhancing ophthalmic lens tempering operations.

SUMMARY OF THE INVENTION

The foregoing and corolary objectives of the present invention are accomplished through the provision of a heat treating machine which is constructed and arranged to operate at either high (e.g. 1,300° F) or relatively low (e.g. 1,180° F) oven temperatures and automatically program operations involving the use of at least one of the aforesaid oven temperatures together with suitable jet-emitted compressed air or relatively low pressure cooling means properly automatically placed into operation in conjunction with respectively cognate oven temperatures.

Details of the present invention will become more readily apparent in the following description when taken in conjunction with the accompanying drawings.

IN THE DRAWINGS

DESCRIPTION OF THE PREFERRED EMBODIMENTS

Figure 1:
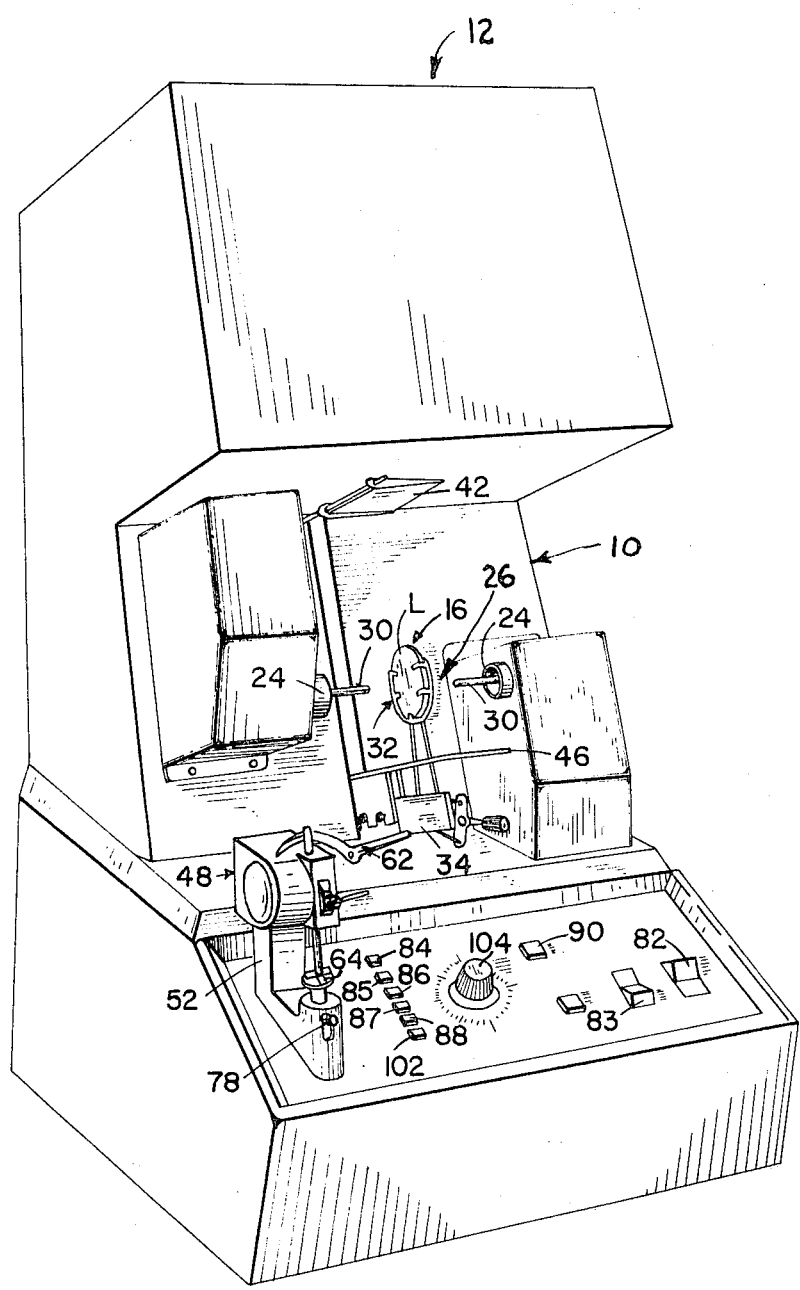
FIG. 1 is an illustration, in perspective, of a preferred embodiment of the present invention.
Figure 2:
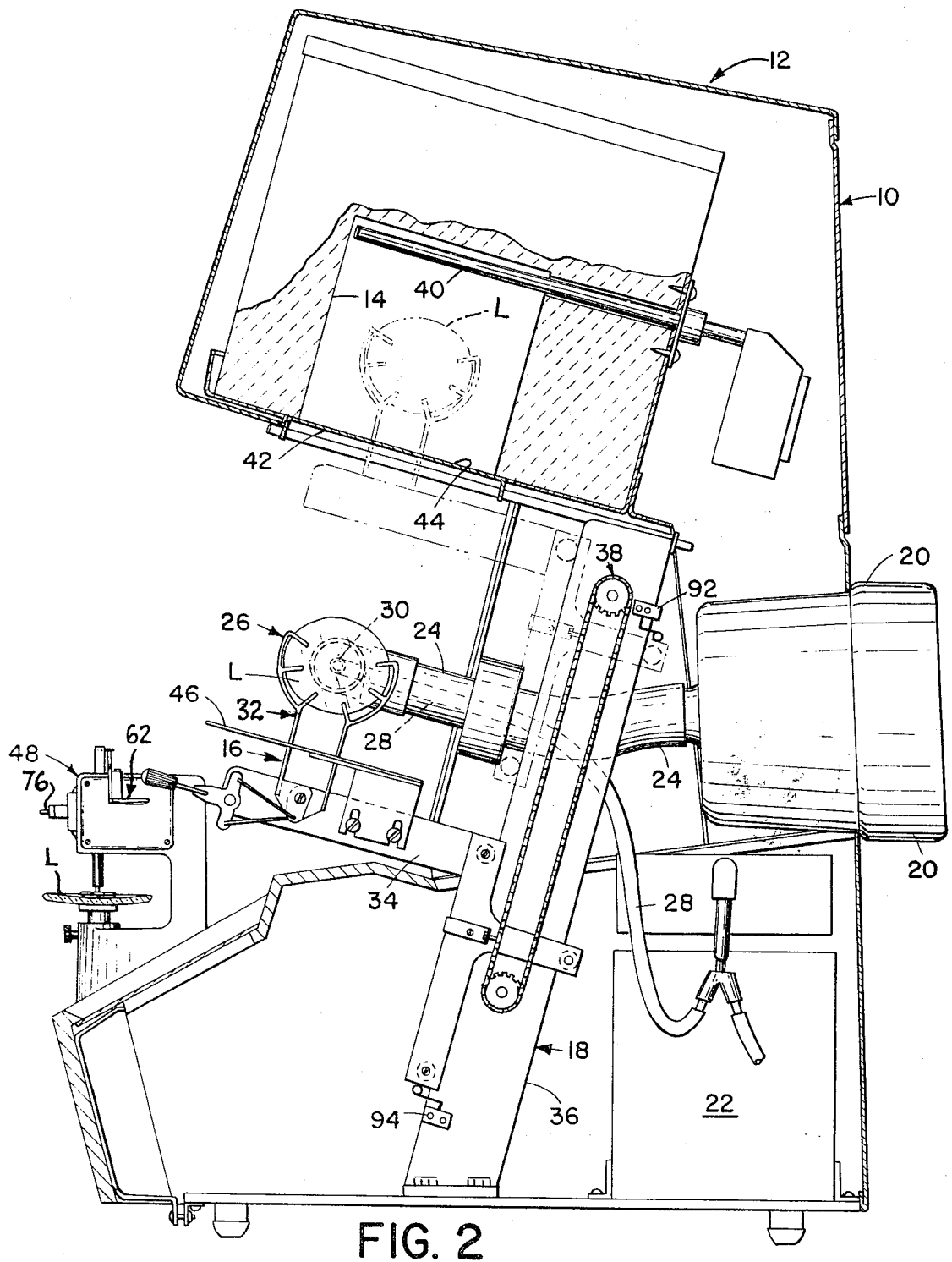
FIG. 2 is a vertical cross-sectional view taken approximately centrally through the heat treat machine shown in FIG. 1.

Referring more particularly to FIGS. 1 and 2 of the drawings, housing 10 of heat treat machine 12 supports furnace 14, lens holder 16 and an elevator mechanism 18 for moving a lens L upwardly into furnace 14 for heat treating and outwardly of the furnace for cooling after heating. Also contained within housing 10 are blower 20 and air compressor 22 for cooling lens L after heat treating and lowering from furnace 14. Air ducts 24 extend from blower 20 to a cooling station indicated by arrow 26 wherewith a large volume low pressure flow of air may be used to cool lens L at station 26 while high pressure tubes 28 extending from compressor 22 have emitting jets 30 located centrally within ducts 24 at station 26 as alternative means for cooling lenses L at station 26 as will be described shortly.

Lens clamp 32 holds lens blanks L for lifting into and lowering from furnace 14 by means of elevator bracket 34. Bracket 34 is moved upwardly and downwardly along track 36 by motor driven chain drive mechanism 38.

Furnace 14 having heating element 40 is provided with door 42 which is tripped open by elevator bracket 34 as lens L approaches opening 44 in furnace 14. Cover plates 46 carried by bracket 34 close opening 44 when lens L is fully entered into furnace 13. Upon retraction of lens L from furnace 14 by the lowering of bracket 34 to a point bringing lens L below door 42 the door automatically swings into closed position over opening 44.

In its operation of automatically programming heating and cooling cycles according to color and thickness characteristics of lenses L to be treated in machine 12, electronic thickness gauge 48 is used to set machine 12 for the timing of a heating cycle of lens L in furnace 14 according to the lens L thickness. Gauge 48 accomplishes the foregoing by adjusting the electrical resistance value of a variable resistor or rheostat 50. Rheostat 50 regulates the time of operation of furnace 14 in a manner to be described in detail hereinafter with particular reference to FIG. 4. At this point, however, mechanical details of gauge 48 will be described for clarifying its operation in adjusting rheostat 50.

Figure 3:
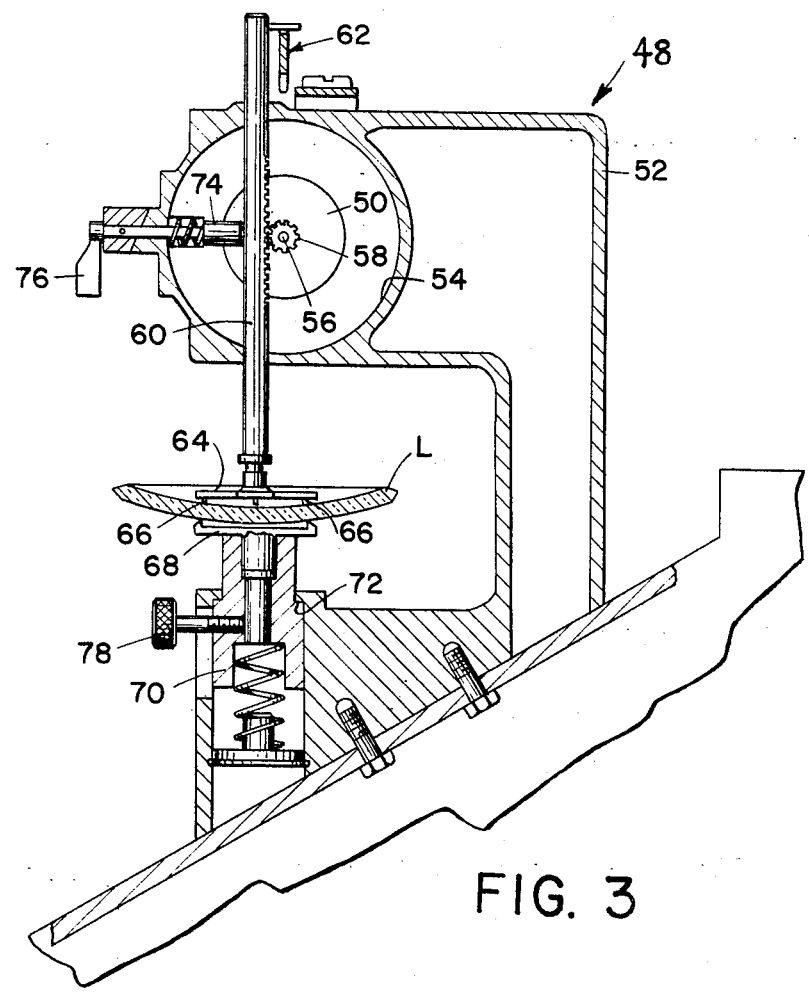
FIG. 3 is an enlarged cross-sectional view of a lens gauging component of the machine.

Referring more particularly to FIG. 3, it will be seen that gauge 48 has main body 52 with internal cavity 54 containing rheostat 50 from which rotor shaft 56 extends. Pinion 58 on shaft 56 is rotated by vertical movement of rack 60 when manually operated by lever 62. Attached to the lowermost end of rack 60 is spider 64 having lens contact pins 66 and coaxially beneath spider 64 is lens anvil 68 held by upwardly spring biased plunger 70.

The thickness of a lens is gauged with anvil 68 located in its normally biased uppermost position, i.e. with plunger 70 against shoulder 72 of main body 52. Lever 62 is depressed to lift spider 64 away from anvil 68 and allow the placing of exemplary lens is shown in dot-dash outline upon anvil 68 so that spider 64 can be lowered against the lens causing rack 60, pinion 58 and shaft 56 to automatically set rheostat 50 according to the thickness of lens L (the distance between anvil 68 and pins 66 of spider 64). With rheostat 50 so adjusted, rack 60 is locked in place by rotation of handle 76 which presses lock 74 against rack 60 preventing vertical displacement thereof. Rotation of handle 76 in one direction cams lock 74 toward rack 60 to perform the aforesaid locking operation. Oppositely directed rotation of handle 76 moves lock 74 away from rack 60.

With the resistance of rheostat 50 established according to the thickness of lens L and locked against displacement, plunger 70 is depressed, using knob 78, to move anvil 68 downwardly and release lens L from gauge 48 for placement in lens clamp 32 as it is shown with full line illustration.

Figure 4:
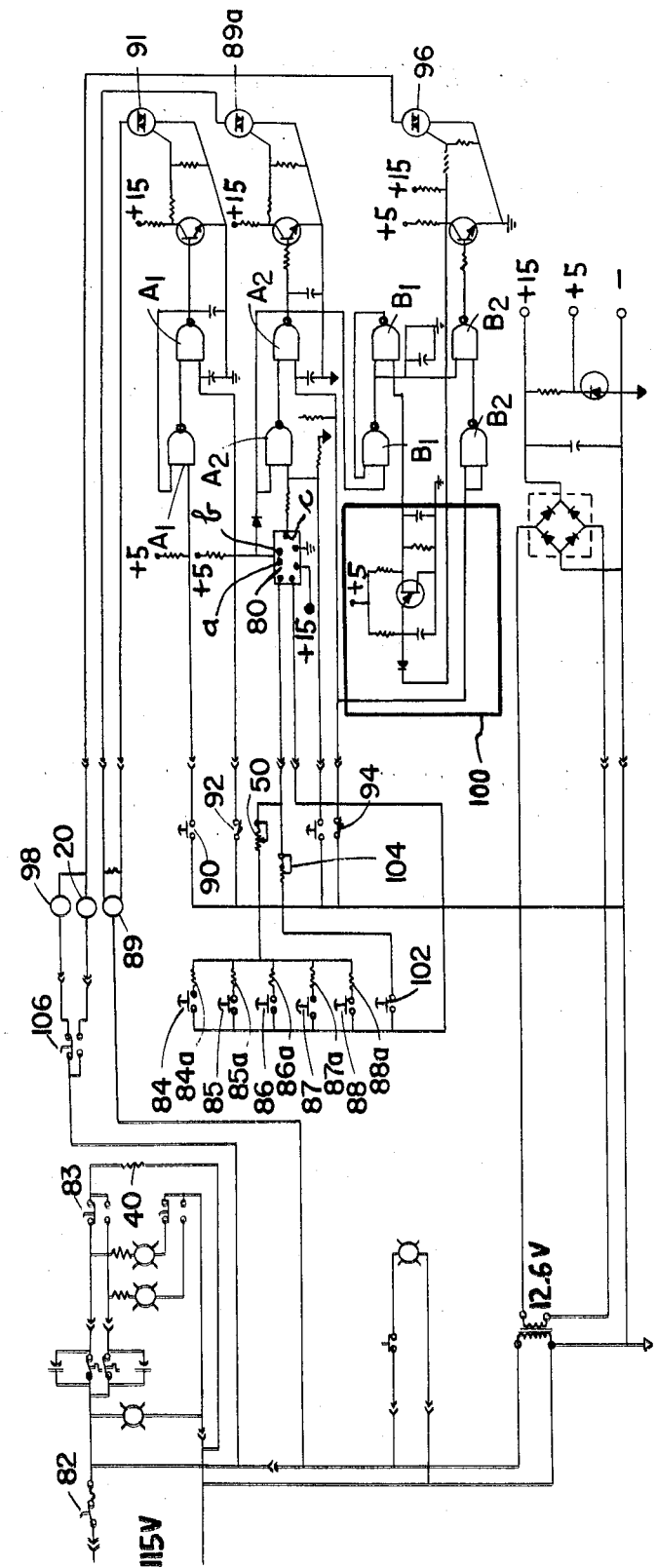
FIG. 4 is a schematic diagram of electrical circuitry and its associated mechanical components in the heat treat machine.

The heat treating of gauged lens L is accomplished as follows:

Referring more particularly to the schematic wiring diagram of FIG. 4 wherein mechanical components illustrated in FIGS. 1–3 are designated by like reference numerals, it can be seen that the electrical resistance of rheostat 50 and that of one of resistors 84a–88a applied to timing module 80 functions in the circuit of FIG. 4 to regulate the time of exposure of lens L to heat in furnace 14. To begin the lens heat treating cycle, however, main power switch 82 must be closed and oven switch 83 placed in either the high or low closed position to heat furnace 14. The high position causes element 40 to heat furnace 14 to a temperature of 1,300° F and maintain such temperature with thermostatic control. The low position of switch 83 heats and maintains furnace 14 at 1,180° F.

The treatment of lenses with the high temperature of 1,300° F will be described first, this being an optimum heat treating temperature for lenses within the range of curvature of from plano to ± 5.00 diopters.

When furnace 14 has had sufficient time, e.g. 45 to 90 minutes, to reach its proper temperature, one of electrical switching selector buttons 84–88 is depressed according to the color of lens L to be heat treated whereby each closed selector button places in circuit with timing module 80 an electricql resistance. In the case of button 84, the electrical resistance 84a placed in circuit with resistor 50 determines the time that lens L is held in the furnace by timing module 80. Electrical resistances 85a–88a associated with buttons 85–88 each subtract 10 seconds from timing of the preceding button-resistor combination.

Timing module 80, being a conventional solid state time delay switch, provides a time delay or timing cycle of 0.02 seconds per ohm of resistance applied thereto (i.e. the sum of the resistance of rheostat 50 and that of the selected one resistance of resistors 84a–88a. It is pointed out that each electrical resistance 84a–88a, in that order, produces a decrease in lens L heating cycle time according to its color density or heat absorbing characteristics.

Having selected a proper electrical resistance factory according to the color density of lens L and thickness of lens L as measured with rheostat 50, the elevator drive motor 89 (FIG. 4) is energized by depressing button 90 causing digital logic devices $A_1$ to function as gates to trigger the closing of motor power switch 91. Motor 89 operates chain drive mechanism 38 (FIG. 2) causing elevator bracket 34 to raise and lift lens L upwardly into furnace 14. When lens L is in furnace 14 and opening 44 becomes closed by plate 46, a microswitch 92 is closed by mechanical contact with bracket 34. Switch 92 energizes timing module 80 and shuts motor 89 off by bringing points a and b to electrical ground. This, in turn, causes the timing module 80 to begin a timing cycle of 0.02 seconds per ohm of the above described resistance applied thereto. At the end of the timing cycle, the electrical output at point c of module 80 changes (i.e. drops or lowers) causing digital logic devices $A_2$ to function as gates to trigger the closing of motor power switch 89a by means of the illustrated amplifier circuit and energize motor 89.

Motor 89 then lowers elevator bracket 34 bringing lens L out of furnace 14 and into cooling station 26. Upon reaching station 26, i.e. the lowermost position of elevator bracket 34, switch 94 is closed by mechanical contact of bracket 34. Switch 94 stops motor 89 and causes digital logic devices $B_1$ to function as gates to trigger the closing of power switch 96 which energizes air compressor 98. This forces compressed air against lens L through jets 30 for cooling of the lens. The electrical timing circuit shown within outline 100 regulates the duration of the cooling cycle. At the end of this cooling cycle, compressor 98 is turned off by digital logic devices $B_1$ and $B_2$ functioning as gates to trigger the opening of power switch 96.

Timing module 80, digital logic devices $A_1$, $A_2$, $B_1B_2$ and power switches 89a, 91 and 96 as well as circuit components associated with each and/or combinations of the above are shown for purposes of illustration only; it being understood that equivalent equipment and circuitry may be substituted therefor. Those interested in greater details of the aforementioned electrical components and their functions or uses may refer to Digital Logic Handbook, 1970 Edition by Digital Equipment Corporation, Copyright 1969, 1970 and Transistor Manual, revised Seventh Edition printing 1969, edited and produced by General Electric Company.

A typical heat treating cycle for an uncolored glass lens having an average thickness of approximately 2.6 inches would include heating at a temperature of 1,300° F for approximately 1 minute and 30 seconds followed by cooling with compressed air forced thereupon for a period of time of one or more minutes.

In the case of heat treating lenses above the ± 5.00 diopter range and/or other than clear lenses above −2.00 diopters, it may be preferable to schedule the heating cycle manually, i.e. without using thickness gauge 48 and to also use a lower furnace temperature of approximately 1,180° F. In such a case, the following operating procedure may be followed:

Main power switch 82 is turned on as usual, switch 83 is placed in the closed lower position and sufficient time is allowed for furnace 14 to become thermostatically adjusted to the thus selected low temperature of 1,180° F. Having weighed a lens to be heat treated and determined from suitable calculations and/or prepared charts to indicate a proper duration of heating according to the weight and average diameter of the lens, manual timing switch 102 is closed to bypass all electrical resistances 84a–88a. Manual rheostat 104 is then adjusted to provide a proper electrical resistance which, in allowing the aforementioned 0.02 seconds per ohm will provide the total proper heating cycle for the lens to be treated. A typical heating cycle for an uncolored glass lens weighing approximately 15 grams and being approximately 45mm in diameter is four minutes and 40 seconds.

Rheostat 104 having been adjusted as just described, the lens is placed in clamp 32, switch 90 is closed to raise the elevator bracket upwardly to furnace 14 closing switch 92 causing the timing cycle, now regulated by timing module 80, to begin. Completion of the heating cycle and lowering of the lens from the furnace is accomplished in the same manner as described hereinabove in connection with the fully automatic timing process. The exception in this case being, however, that low velocity air cooling by blower 20 through ducts 24 is used rather than the previously described compressed air cooling. Blower 20 is energized by closing of switch 96 through gates $B_1$ in the manner described above relative to the fully automatic operation. Selector switch 106 and 83 operate together to place air compressor 98 in the electrical power circuit when the high furnace temperature is used and to place the low velocity blower 20 in the power circuit when the lower furnace temperature is used.

We claim:

1. Apparatus for heat treating lenses comprising:
a main housing;
a furnace within said housing;
lens holding and elevating means for raising and lowering a lens to be treated into said furnace for heating thereof and out of said furnace to a cooling station for cooling after heating;
means for producing a forced flow of air and conveying said flow of air to said lens cooling station;
means for automatically regulating a cycle of heating of said lens in said furnace according to a measurement of size of the lens including an electromechanical lens thickness gauge within which said lens is placed for establishing a setting of said gauge according to a thickness measurement of said lens and electrical timing circuitry associated with said thickness gauge for regulating and terminating said cycle of heating of said lens according to said setting of said thickness gauge and for causing said elevating means to lower said lens to said cooling station at termination of said cycle of heating together with activation of said means for producing said flow of air.

2. Apparatus according to claim 1 wherein said lens thickness gauge comprises an anvil and a thickness gauging spider between which said lens is clamped for effecting said thickness measurement, an electrical rheostat having a rotor shaft and coupling means for rotating said rotor shaft an amount determined by the extent of spacing between said anvil and spider imposed by said clamping of said lens therebetween.

3. Apparatus according to claim 2 wherein said coupling means includes a rack and pinion, said pinion being fixed to said rotor shaft, said rack being in mesh with said pinion and said spider being carried by said rack.

4. Apparatus according to claim 3 further including lever means for manually raising and lowering said rack and means for selectively locking said rack at established lens thickness measuring positions for fixing corresponding rotational setting of said electrical rheostat according to measured thicknesses of lenses in each case.

* * * * *